United States Patent [19]
Dorsch et al.

[11] Patent Number: 4,515,073
[45] Date of Patent: May 7, 1985

[54] AIR SCRUBBING SYSTEM

[75] Inventors: Robert Dorsch, Warren; Arnold J. Matusz, West Bloomfield, both of Mich.

[73] Assignee: Alpha-Debon Industries, Inc., Madison Heights, Mich.

[21] Appl. No.: 505,088

[22] Filed: Jun. 16, 1983

Related U.S. Application Data

[63] Continuation-in-part of Ser. No. 399,430, Jul. 19, 1982, abandoned.

[51] Int. Cl.³ .............................................. B05C 15/00
[52] U.S. Cl. ..................................... 98/115.2; 55/223; 55/238; 55/DIG. 46
[58] Field of Search ................. 55/223, 238, DIG. 46; 98/115 R, 115 SB; 118/326, DIG. 7

[56] References Cited

U.S. PATENT DOCUMENTS 3,075,751  1/1963  Najarian .............................. 261/112
4,085,896  4/1978  Dorsch et al. ....................... 239/504
4,239,512  12/1980  Dobias .................................. 55/90
4,279,196  7/1981  Bloomer ........................... 98/115 SB

FOREIGN PATENT DOCUMENTS

222861  7/1959  Australia ........................ 98/115 SB
2316855  4/1973  Fed. Rep. of Germany ........ 55/223
1518013  3/1968  France ................................ 118/326
844077  7/1981  U.S.S.R. ............................. 118/326

Primary Examiner—Harold Joyce
Attorney, Agent, or Firm—Harness, Dickey & Pierce

[57] ABSTRACT

A multi-stage air scrubbing apparatus for removing particulate matter from contaminated air is located beneath the perforate floor of a chamber from which the contaminated air flows in order to allow light to enter the chamber and to permit visual observation of its interior. The apparatus includes a sub-floor flooded with a flowing scrubbing fluid and a scrubbing fluid spray source and conduit means having baffle members that cause the air and the fluid spray to flow in a direction-reversing serpentine path. The contaminated air passes through the scrubbing fluid spray at least twice, and preferably three or more times, in order to remove the particulate matter therefrom.

24 Claims, 7 Drawing Figures

AIR SCRUBBING SYSTEM

BACKGROUND AND SUMMARY OF THE INVENTION

This is a continuation-in-part of the copending application, Ser. No. 399,430, filed July 19, 1982, now abandoned.

The present invention pertains primarily to apparatus for removing particulate matter from contaminated air, and more particularly to such apparatus for use in paint spray booths wherein the air scrubbing apparatus is located below the floor of the spray booth.

Generally, spray booths for use in the application of spray paint to an item to be painted include air ventilation systems for providing a source of fresh air to the interior of the spray booth and preventing the accumulation of paint particles therein. When the ventilation air is discharged from the spray booth, it is highly contaminated with paint particles entrained in the exhaust air. With the increased regulatory attention being given to air quality and environmental standards in recent years, substantially all of the undesirable paint particles must be removed from the spray booth exhaust air before it is discharged to the atmosphere. Therefore, various types of apparatus for removing particulate matter from contaminated air have been proposed. Many of such previously proposed particle removal systems, however, have not been effective in removing substantially all of the particles from the air or have created undue maintenance burdens because of frequent clogging of the components thereof.

In addition to providing air ventilation for spray booths, it has recently become desirable to provide the sidewalls of the spray booths with substantially transparent windows or panels. Such windows or panels have been found to have a positive effect on productivity of workers inside the spray booths by admitting more light to the interior of the booth and by reducing the workers' feeling of being closed in. In spray booth operations employing robots or other automated paint application devices, such windows or panels are desirable so that an external operator or supervisor may visually observe the condition and operation of the automatic equipment. Many of the previous systems for removing paint particles from spray booth exhaust air include large scrubber chambers that extend vertically on one or both sides of the booth, thus blocking the light coming through any window portions of the sidewalls and restricting visual observation of the interior of the booth. The need has arisen, therefore, for an apparatus for removing undesirable particulate matter from contaminated air, that is capable of removing substantially all of said particulate matter, that requires little or no maintenance, and that may be located other than adjacent the sides of a spray booth, thereby permitting visual observation of the interior thereof.

In accordance with the present invention, an improved air scrubbing apparatus for a chamber or enclosure having a perforate floor, such as grating, for example, is located entirely beneath the perforate floor, thereby allowing the sidewalls of the chamber to include transparent windows or panels therein. The improved apparatus includes a sub-floor, which is located beneath the perforate floor and flooded with water or other flowing fluids to a depth such that the particulate matter is substantially prevented from accummulating on the sub-floor as the contaminated air flows through the perforate floor. The sub-floor includes a flow opening, through which the contaminated air flows, and means for producing a fluid spray is also included, said means preferably including a spray head or a similar fluid spray device. A duct or conduit means communicates with the flow opening in the sub-floor and passes the contaminated air through the fluid spray in order to remove the undesirable particulate matter.

The duct or conduit portion of the scrubber section also includes a series of baffles or other flow-directing members configured to direct the fluid spray along a generally serpentine or undulating flow path. The baffles or other members also cause the contaminated air to flow along a serpentine or undulating flow path in a pattern such that the contaminated air passes through the fluid spray at least twice, and preferably three or more times, as it flows through the conduit. In one preferred embodiment, the flowing fluid from the sub-floor is directed or drained toward the baffles or other flow-directing members and to join or merge with the flow of the fluid spray. A fluid collection and drain system located beneath the sub-floor collects the fluid from both the fluid spray and the sub-floor after the fluid has passed through the contaminated air and has removed substantially all of the particulate matter from the air. The exhaust air is then discharged as substantially clean air to the atmosphere.

In a preferred form of the invention, the baffles or other flow-directing members are located and configured with respect to one another such that substantially all of their surfaces that are exposed to the contaminated air flow are covered by a flowing fluid barrier for substantially preventing the accumulation of particulate matter thereon. Such an arrangement also allows for highly efficient removal of particulate matter from the air flowing through the scrubber system while significantly reducing the water requirements thereof, and thus also reducing the water pumping energy consumed thereby.

In at least some of the embodiments of the invention, it is desirable to include a diverter member that diverts a portion of the fluid spray and directs the diverted portion toward certain predetermined surfaces of the conduit in order to prevent accumulation of particulate matter thereon. In such embodiments, the diverter member cooperates with the baffles or other members to cause at least some of the diverted portion to flow along the predetermined conduit surfaces, thus effectively providing a fluid barrier between the particulate matter and said surfaces. An example of such a diverter member is described in our copending application, filed on June 18, 1982, Ser. No. 389,924 which issued on Feb. 14, 1984, as U.S. Pat. No. 4,431,435 for "Improved Spray Apparatus For Fluid Dispersion". The disclosure of said copending application and the resultant U.S. Pat. No. 4,431,435 are incorporated by reference herein. Finally, one example of the apparatus or spray head for producing a fluid spray, mentioned above, is disclosed in U.S. Pat. No. 4,085,896, issued to Dorsch et al on Apr. 25, 1978, the disclosure of which is incorporated by reference herein. Such a spray head has been found to be very effective in facilitating the removal of substantially all undesirable particulate matter from contaminated air.

DETAILED DESCRIPTION OF THE PREFERRED EMBODIMENTS

FIGS. 1 through 7 of the drawings depict various embodiments of the scrubber or particulate removal apparatus of the present invention for purposes of illustration only. One skilled in the art will readily recognize, however, that the principles of the present invention are equally applicable to particulate removal systems other than that shown in the drawings and to systems or apparatus other than paint spray booths.

Figure 1:
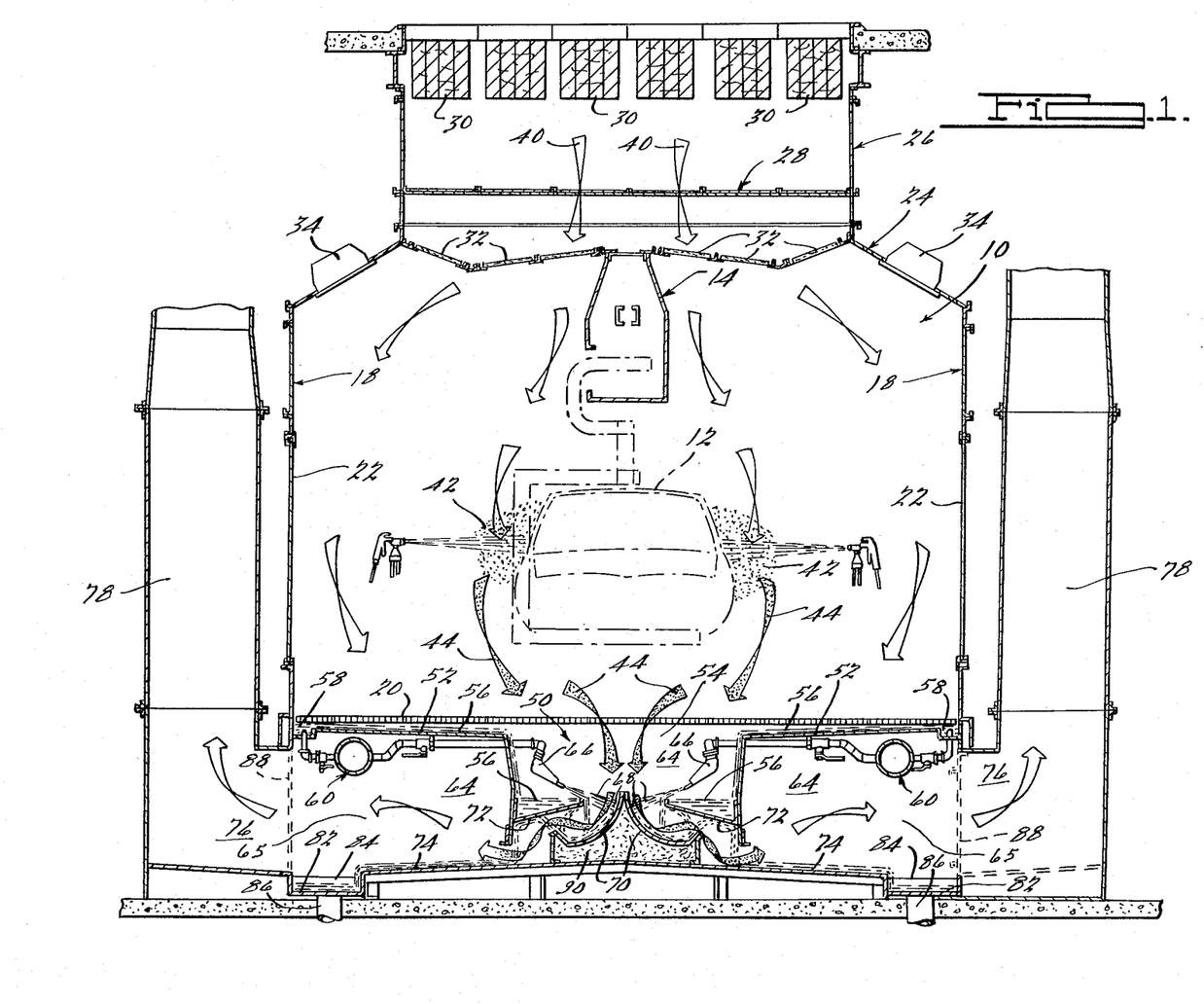
FIG. 1 is an elevational cross-section view of one exemplary paint spray booth and air scrubber apparatus embodying the present invention.

FIG. 1 illustrates one exemplary embodiment of a paint spray booth or enclosure 10 for applying paint to vehicle bodies 12 passed therethrough on a conveyor apparatus 14. The spray booth 10 includes a pair of sidewalls 18 and a perforate floor 20 composed, for example, of grating. A ceiling structure 24 includes an air intake conduit or duct 26 having adjustable baffles or louvers 28 situated between a pair of air filter banks 30 and 32. A number of lamps 34 are located at various locations of the ceiling structure 24 to provide illumination for the interior of the spray booth 10.

One or more air handling units (not shown) cause an air flow, indicated by reference numeral 40, to enter the spray booth through the ceiling structure 24, thereby providing a source of fresh ventilation air. The fresh air flow entering the interior of the spray booth 10 becomes laden with entrained paint particles, indicated by reference numeral 42, and thus becomes the contaminated air indicated at 44. The contaminated air 44 is exhausted from the interior of the spray booth through the perforate floor 20 and enters the particle removal apparatus or scrubber section 50.

A sub-floor 52 is located beneath at least a portion of the perforate floor 20 and includes a flow opening 54 therein. The sub-floor is flooded with a flowing sub-floor fluid 56 to a depth sufficient to substantially prevent the accumulation of paint particles 42 on the sub-floor 52 as the contaminated air 44 flows through the perforate floor. The sub-floor fluid 56 continually flows along the perferably inclined sub-floor from the supply trenches 58 which are kept full of fluid from the fluid supply system 60. The sub-floor fluid 56 drains through the flow opening 54 and is directed toward a series of baffle or other flow-directing members, which are described in detail below.

A conduit or duct 64 communicates with the flow opening 54 and extends beneath the sub-floor 52. One or more spray heads 66, or other apparatus for producing a fluid spray, are located in the conduit 64 and direct a fluid spray 68 toward an initial baffle 70. The fluid spray 68 is directed by the initial baffle 70 in a curved pattern toward a secondary baffle 72 where it again reverses its direction and flows toward a bottom portion 74 of the conduit 64. Thus the initial and secondary baffles 70 and 72, respectively, force the fluid spray 68 along a generally serpentine fluid flow path in the conduit 64.

In addition to causing a serpentine or undulating flow path for the fluid spray 68, the initial and secondary baffles 72 on each side of the scrubber apparatus also cause the contaminated air flow 44 to assume a tortuous serpentine flow path such that the contaminated air passes through the fluid spray 68 at least twice, and preferably three or more times, before passing through a plenum chamber 65 and then being admitted as substantially clean air to each exhaust portion 76 of the conduit 64. Prior to being exhausted through the exhaust portions 76, however, the velocity of the air is substantially reduced in the plenum chambers 65 in order to allow entrained moisture to drop out of the air stream. The air is then vented to the atmosphere through a number of vent stacks 78 widely spaced along the exterior of the spray booth sidewalls 18. Preferably, the vent stacks 78 are spaced at very wide intervals in order to minimize the restriction of light or observational access through the transparent windows or panels 22.

The sub-floor fluid 56 which drains from the sub-floor 52 is directed toward the initial baffle member 70 such that it passes through the contaminated air flow 44 and merges with the fluid spray 68. A pair of drain trenches 82 are located at opposite ends of the conduit 64 and include floor portions 84 which are sloped toward drains 86 for removal of the fluid from the sub-floor and the fluid spray, which has since become contaminated with paint particles removed from the contaminated air. The contaminated fluid is carried by the drains 86 to a sludge disposal system for the facility in which the spray booth 10 is located.

At least the initial baffle 70 is preferably equipped or filled with a sound-absorbing material 90 for reducing the noise resulting from the impact of the fluid spray 68 against the baffle member. The other baffle members in the conduit 64 may also be equipped with a sound-absorbing material if found desirable or necessary. Additionally, access doors 88 are spaced along both sides of the scrubber section to provide convenient access to the interior of the conduit 64.

Figure 2:
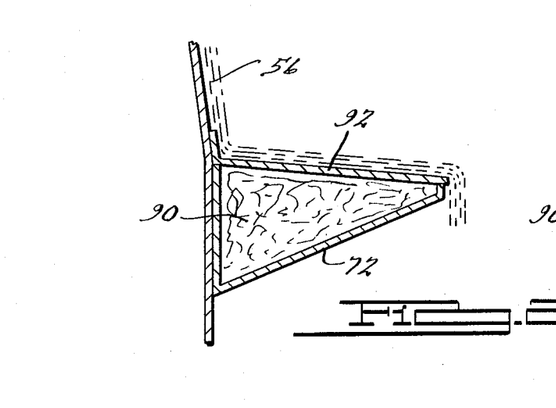
FIG. 2 is a detail view of a portion of the paint spray booth and air scrubber apparatus of FIG. 1, showing an alternate variation thereon.

FIG. 2 illustrates a detail view of a variation on the embodiment of the invention shown in FIG. 1. In FIG. 2, the upper portion of the secondary baffle 72 is covered by a sloping run-off member 92 to prevent the accumulation of water in the upper portion of the secondary baffle such as occurs in the embodiment shown in FIG. 1. In other respects, however, the function and flow patterns in the confuit 64 are the same as those discussed in connection with FIG. 1.

Figure 3:
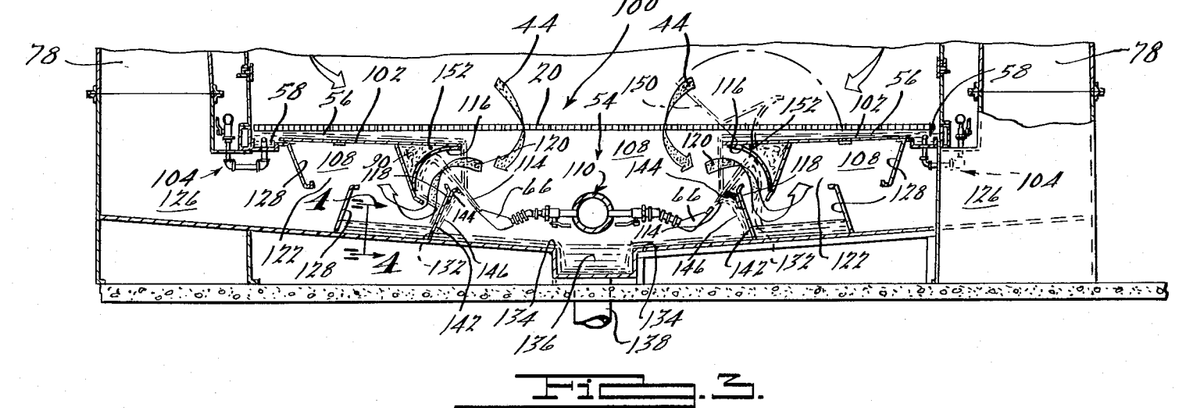
FIG. 3 is a partial elevational cross-section view of an alternate embodiment of the scrubber apparatus for another exemplary paint spray booth similar to that shown in FIG. 1.
Figure 4:
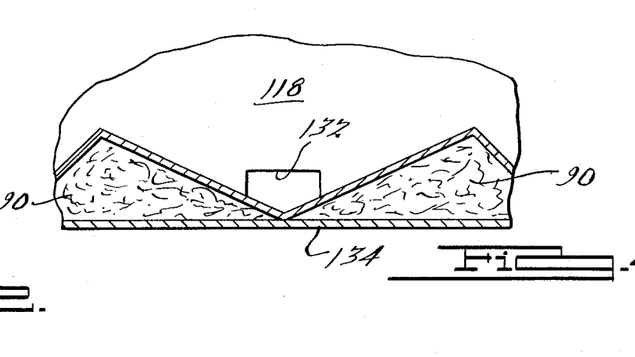
FIG. 4 is a sectional view taken along line 4—4 of FIG. 3.

FIG. 3 illustrates an alternate embodiment of the present invention which is particularly applicable for installation where the particulate removal apparatus must be installed in a space of restricted vertical dimensions. In the description of the alternate scrubber section or particulate removal apparatus 100, shown in FIG. 3, the reference numerals used to describe elements similar to those in the FIG. 1 embodiment are substantially the same as the corresponding numerals of FIG. 1.

In FIG. 3, the particulate removal apparatus 100 includes a sub-floor 102 located beneath at least a portion of the perforate floor 20 and forming a flow opening 54 therein. The sub-floor 102 is continually flooded with the flowing sub-floor fluid 56 from the supply trenches 58 as described above in connection with FIG. 1. The supply trenches 58 are kept continually full and overflowing with fluid from fluid supply systems 104 located at opposite sides of the scrubber section 100.

A conduit or duct 108 extends generally in opposite directions below the sub-floor 102, communicates with the flow opening 54, and serves to force the contaminated air flow 102 through a fluid spray 114 produced by the spray heads 66 with fluid from the fluid supply system 110. The fluid spray 114 is directed by the spray heads 66 to impact upon respective initial baffle or other flow-directing members 116. The initial baffle members 116 direct the fluid spray 114 in an undulating serpentine pattern to impact upon the respective secondary baffle or other flow-directing members 118. Similarly, the initial and secondary baffle members 116 and 118, respectively, cause the contaminated air flow 120 to flow in a tortuous serpentine path to pass through the fluid spray 114 at least twice as it travels through each portion of the conduit 108 and into respective plenum chambers 122. The velocity of the air in the plenum chambers 122 is substantially reduced from the velocity of the air flowing through the baffle area in order to allow entrained moisture to drop out of the airstream. Such moisture removal is also enhanced by the contact of the air with the optical moisture eliminating baffle 128. Thus the contaminated air flow 120 emerges from the plenum chambers 122 and flows into the exhaust portions 126 of the conduit 108 as clean air which may be vented to the atmosphere through the vent stacks 78.

The sub-floor fluid 56 is drained from the sub-floor 102 toward the secondary baffle member 118 where it passes through the contaminated air flow 120 and merges with the fluid spray 114. The combined sub-floor fluid 56 and the fluid spray 114 are discharged through the drain openings 132 at the bottom of the secondary baffle members 118 and flow along the inclined bottom portion 134 of the conduit 108 where they are collected and drained to a sludge disposal system through a collection trench 136 and a drain 138.

In order to prevent the accummulation of the paint particles on the various unwashed conduit surfaces, such as those indicated by reference numeral 142, the particulate removal apparatus 100 includes a diverter apparatus in which a curved vane member 144 which is attached to, and protrudes from, the secondary baffle member 118. The curved vane member 144 diverts a portion 146 of the fluid spray 114 and directs it along the unwashed conduit surfaces such as surface 142. The curved vane member 144 cooperates with the diverging fluid spray 114 to cause the diverted portion 146 to diverge in a direction away from the spray heads 66. The diverted portion 146 therefore effectively forms a fluid curtain or fluid barrier along the surfaces such as surface 142 to prevent paint particles from collecting or accummulating thereon. The curved vane member 144 is preferably attached to the secondary baffle member 118 by fasteners (not shown) extending through elongated openings to allow the position of the vane member relative to the secondary baffle to be selectively adjusted in order to vary the quantity or direction of the diverted portion 146 as desired to achieve an optimum combination of conduit surface cleaning. Such an adjustable arrangement is described in the above-referenced copending application, Ser. No. 389,924, filed June 18, 1982.

In order to provide access for maintenance or repair of the particulate removal system 100, should such access become necessary, the portion of the sub-floor 102 to which the initial baffle member 116 is attached, designated generally by reference numeral 150, is hinged to the remainder of the sub-floor 102 by hinge member 152. Therefore, as is shown in phantom lines in FIG. 3, the hinged portion 150 may be pivoted toward the flow opening 54 to provide clear access into the conduit 108.

As is described above in connection with the embodiment of FIG. 1, at least the baffle members 116 are preferably equipped or filled with a sound-absorbing material 90 in order to reduce the noise resulting from the impact of the fluid spray 114 against the baffle member. The other baffle members in the conduit 108 may also be similarly equipped with sound-absorbing material 90 if found desirable or necessary in a particular installation.

Figure 5:
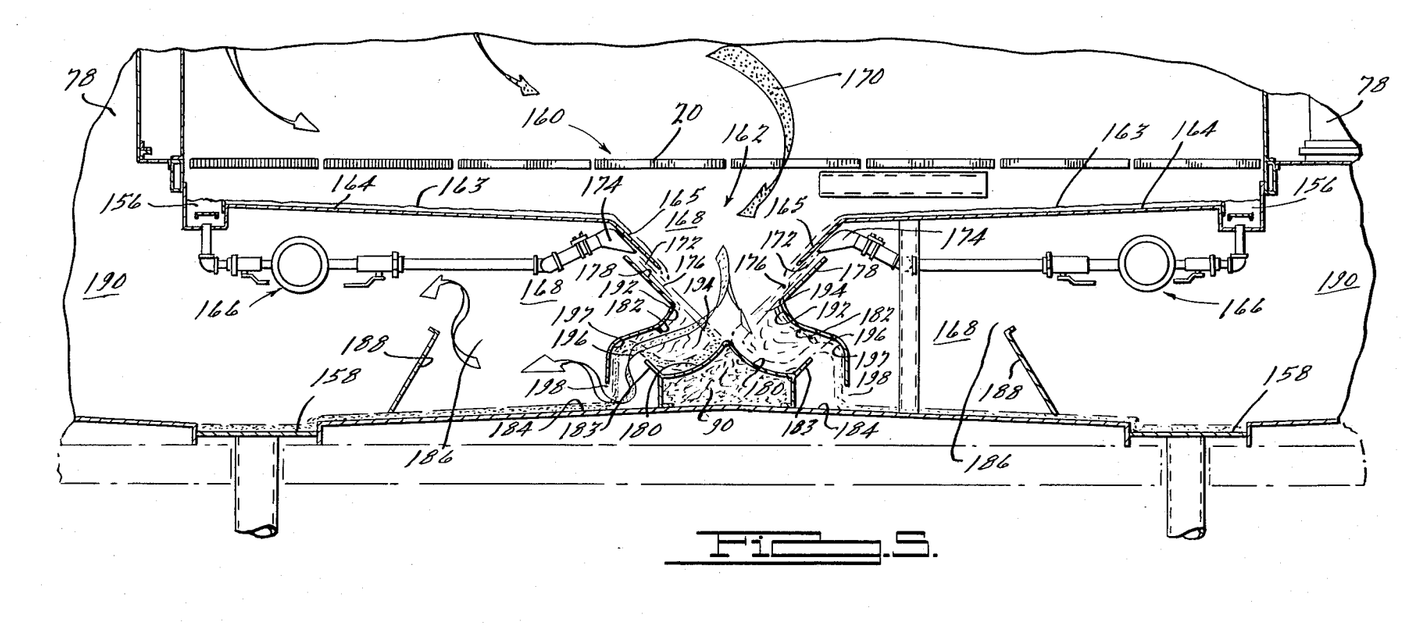
FIG. 5 is a partial elevational cross-section view of a portion of the paint spray booth and air scrubber apparatus of FIG. 1, showing a preferred variation thereon.
Figure 6:
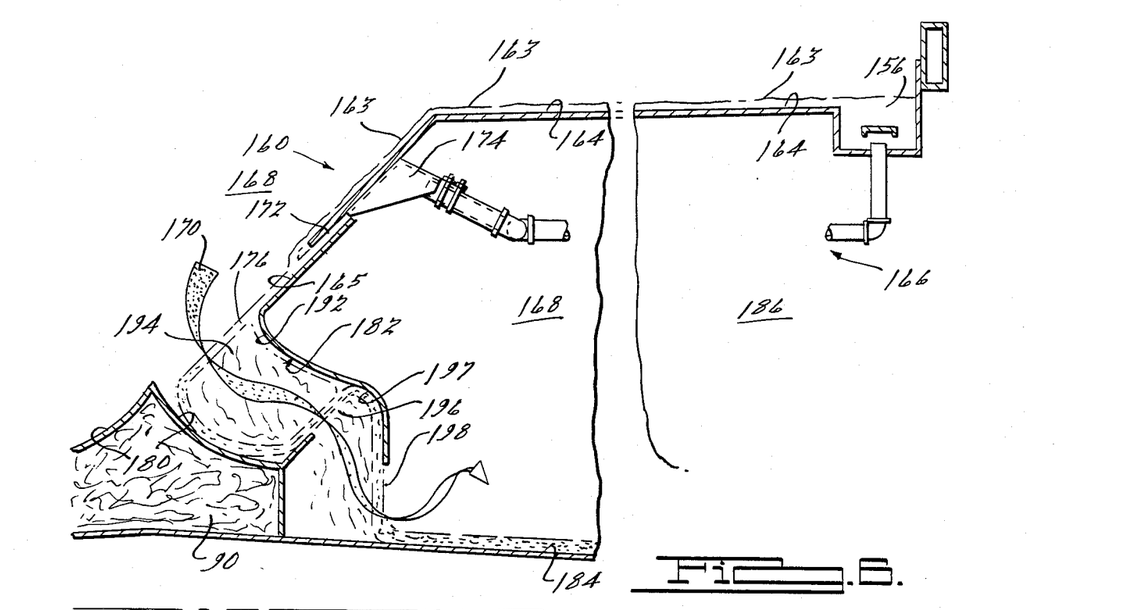
FIG. 6 is an enlarged detail view of a portion of the air scrubbing apparatus of FIG. 5.
Figure 7:
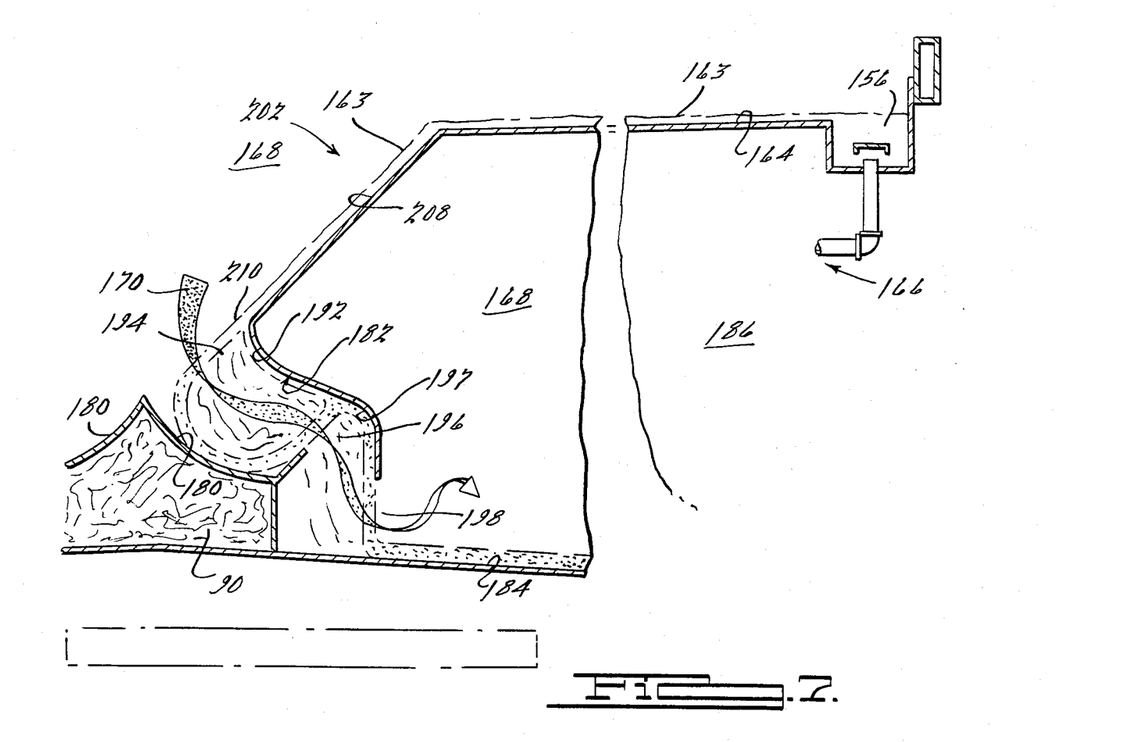
FIG. 7 is an enlarged detail view similar to that of FIG. 6, but illustrating an alternate variation of the apparatus of FIG. 5.

FIGS. 5 and 6 illustrate a preferred embodiment of the invention, including the scrubber section or particulate removal apparatus 160, and FIG. 7 illustrates a variation thereon, including the scrubber section or particulate removal apparatus 202. The reference numerals used to indicate elements similar to those of FIGS. 1 through 4 are the same as the corresponding numerals in FIGS. 5 through 7.

In FIG. 5, the particulate removal apparatus 160 preferably include a pair of sub-floor portions 164 located beneath at least a portion of the perforated floor 20, each having an inclined apron portion 165 forming a flow opening 162 therein. The sub-floors 164 are kept continually flooded with sub-floor fluid 163 from the fluid supply systems 166, preferably located at opposite sides of the scrubber section 160.

A conduit or duct 168 extends generally in opposite directions below the sub-floor 164, communicates with the flow opening 162, and serves to force the contaminated air flow 170 through a fluid spray or system of fluid curtains as described below. In the preferred embodiment illustrated in FIG. 5, a pair of fluid sprays 172 are produced by the spray heads 174, which are preferably located behind or beneath the apron portions 165 in order to shield the spray heads 174 from the contaminated air flow 170, thereby substantially preventing particulate accumulation thereon. Each of the fluid sprays 172 is directed so as to merge with, or inspirate, the sub-floor fluid 163 flowing along the apron portions 165 in order to form a combined spray flow 176.

The combined spray 176 on each side of the scrubber section 160 flows along an inclined plate 178 to impinge at a high velocity against its respective initial baffle or other flow-directing member 180. The initial baffle members 180 direct the combined fluid sprays 176 in undulating serpentine flow patterns to impact upon respective secondary baffles or other flow-directing members 182, which in turn redirect the combined fluid sprays 176 in generally downward directions to the inclined bottom portions 184. Similarly, the initial and secondary baffle members 180 and 182, respectively, cause the contaminated air flow 170 to flow in tortuous serpentine paths to pass through the combined fluid spray 176 at least twice, and preferably three or more times, as it travels through each side of the conduit 168 and into respective plenum chambers 186.

In the plenum chambers 186, the velocity of the air is substantially reduced from the velocity of the air flowing through the baffle area in order to allow entrained moisture to drop out of the airstream. To further facilitate such removal of entrained moisture from the air in the plenum chambers 186, moisture eliminating baffles 188 protrude in generally vertical directions into the plenum chambers 186 and provide surfaces upon which the entrained moisture collects as the moisture-laden air flows through the plenum chambers. Thus the contaminated air flow 170 emerges into the exhaust portions 190 of the conduit 168 as clean air which can be vented to the atmosphere through the vent stacks 78.

The sub-floor fluid 163 drains along the inclined sub-floors 164 and the apron portions 165 toward the flow opening 162 at a flow rate sufficient to create a depth and constant flowing movement of fluid in order to continuously flush the sub-floor portions 164 and apron portions 165 thereby preventing contaminants from collecting thereon. After the sub-floor fluid 163 has merged with, and been inspirated by, the fluid sprays 172 from the spray heads 174, the majority of the high-velocity combined spray flows 176 impinge upon their respective initial baffle members 180 to create a fluid curtain in the first flow throat 194 as described above. A lesser portion of each of the combined spray flows 176, however, attaches itself to at least a substantial portion of its respective arcuate surface 192 of the secondary baffle 182 and flows therealong in order to substantially prevent the deposit and accummulation of contaminants on the secondary baffle members. Still another small portion of each of the combined spray flows 176 becomes dispersed within the contaminated air stream flowing through the first flow throat 194 between the secondary baffle members 182 and the initial baffle members 180. Such disbursement of fluid within the air stream greatly aids in the efficient scrubbing or removal of contaminants from the air.

The combined spray flows 176 flowing along their respective initial and secondary baffle members 180 and 182, and along the lip portions 183 on the baffle members 180, reunite or join together in a second flow throat 196 as the high-velocity combined spray flow from the initial baffle 180 impinges upon the secondary baffle member 182 in order to create still another fluid curtain through which the contaminated air must pass. The reunited combined spray flows 176 then flow along at least a substantial portion of their respective arcuate surfaces 197 and then across respective third flow throats 198 at a high velocity to impinge upon the inclined bottom portions 184, thereby creating a third spray flow curtain through which the contaminated air must pass before entering into the plenum chambers 186. It should be noted that substantially all surfaces of the scrubber apparatus that are exposed to contaminated air flow are wetted by the fluid as described above in order to substantially prevent the deposit and accummulation of contaminants thereon. Finally, the combined spray flows 176 flow along the inclined bottom portions 184 to be discharged through the drain openings or trenches 158 to be collected and conveyed to a sludge disposal system wherein the contaminants are filtered therefrom and the fluid is recycled into the scrubber apparatus by way of the fluid supply systems 166. It should be noted that in order to facilitate the flow of the contaminant-laden fluid along the inclined bottom portions 184 to the drain trenches 158, the moisture eliminating baffles 188 may be alternatively positioned in a slightly spaced relationship from the upper surface of the inclined bottom portions 184 or may be provided with openings spaced at various locations along the length of the moisture eliminating baffles through which the contaminant-laden fluid may flow.

FIG. 7 illustrates an alternate scrubber section 202 which represents a variation upon the embodiment of the preferred scrubber section 160 illustrated in FIGS. 5 and 6. In the scrubber section 202, the spray heads 174 are eliminated and the apron portions 165 shown in FIGS. 5 and 6 are replaced by continuous apron portions 208. In such alternate scrubber section, all of the fluid used for scrubbing or removing contaminants from the air flow 170 is passed or directed along the flooded sub-floor portions 164 and flows at a high velocity along the continuous apron portions 208 to create or produce a high-velocity spray flow 210 which flows through the baffle area in a manner similar to that described above for the combined spray flows 176 in FIGS. 5 and 6. It should be noted that where the components of the alternate scrubber section 202 are substantially the same as the corresponding components of the preferred scrubber section 160 illustrated in FIGS. 5 and 6, the same reference numerals are used to indicate such components in FIG. 7. It should also be noted that at least the initial baffles 180 are also preferably equipped or filled with a sound-absorbing material 90 in the embodiments of FIGS. 5 through 7 in order to reduce the noise resulting from the impact of the fluid sprays against the baffle members.

The foregoing discussion and the accompanying drawings describe and illustrate merely exemplary preferred embodiments of the present invention. One skilled in the art will readily recognize, however, that the invention is susceptible to modification, variation and change without departing from the proper scope or fair meaning of the following claims.

We claim:

1. In an apparatus for removing particulate matter from contaminated air, said contaminated air flowing from a chamber through a perforate floor of said chamber, the improvement comprising:
a sub-floor beneath at least a portion of said perforate floor, means for flooding said sub-floor with a flowing fluid to a depth sufficient to substantially prevent the accumulation of said particulate matter on said sub-floor as said contaminated air flows through said perforate floor, a flow opening in said sub-floor for receiving both said contaminated air and said sub-floor fluid flowing therethrough;
means located beneath said sub-floor out of said air flow for producing a fluid spray;
means for inspirating at least a portion of said sub-floor and for merging said flowing sub-floor fluid with said fluid spray to form a combined fluid spray as said sub-floor fluid flows into said flow opening;
conduit means communicating with said flow opening for passing said contaminated air through said combined fluid spray in order to remove said particulate matter from said contaminated air, said conduit means including
baffle means in said conduit means for directing said combined fluid spray along a generally serpentine fluid flow path and for directing said contaminated air along a generally serpentine air flow path so that said contaminated air passes through said combined fluid spray at least twice as it flows through said conduit means; and fluid collection means for collecting said combined fluid spray after said contaminated air has passed therethrough and for draining said combined fluid spray from said conduit means.

2. The improvement according to claim 1, wherein said fluid spray means, said conduit means and said fluid collection means are all located beneath the elevation of said sub-floor.

3. The improvement according to claim 2, wherein said chamber includes at least one side wall having at least a portion thereof composed of a substantially transparent material.

4. The improvement according to claim 2, wherein said baffle means includes a number of baffle members against which said combined fluid spray impacts, at least one of said baffle members including sound-absorbing material for reducing the noise resulting from the impact of said combined fluid spray against said baffle member.

5. In an apparatus for removing particulate matter from contaminated air, said contaminated air flowing from a chamber through a perforate floor of said chamber, the improvement comprising:

a sub-floor beneath at least a portion of said perforate floor, means for flooding said sub-floor with a flowing fluid to a depth sufficient to substantially prevent the accumulation of said particulate matter on said sub-floor as said contaminated air flows through said perforate floor, a flow opening in said sub-floor for receiving said contaminated air flowing therethrough;

means for producing a fluid spray;

means for merging said flowing sub-floor fluid with said fluid spray to form a combined fluid spray;

conduit means communicating with said flow opening for passing said contaminated air through said combined fluid spray in order to remove said particulate matter from said contaminated air, said conduit means including baffle means in said conduit means for directing said combined fluid spray along a generally serpentine fluid flow path and for directing said contaminated air along a generally serpentine air flow path so that said contaminated air passes through said combined fluid spray at least twice as it flows through said conduit means; and fluid collection means for collecting said combined fluid spray after said contaminated air has passed therethrough and for draining said combined fluid spray from said conduit means;

said fluid spray means, said conduit means and said fluid collection means all being located beneath the elevation of said sub-floor, and said sub-floor including an apron member extending therefrom in a generally downward direction into said flow opening in order to flowingly direct said sub-floor fluid along said apron member and then into said flow opening, said fluid spray means being located beneath said sub-floor and beneath said apron portion in order to be out of the flow of said contaminated air, and said means for producing said fluid spray and said apron member both being oriented generally in said downward direction in order to direct said combined spray flow into said flow opening to impinge upon said baffle means.

6. The improvement according to claim 5, wherein said baffle means includes a number of baffle members configured to define said generally serpentine flow path therebetween, said baffle members further being configured to direct at least a portion of said combined spray in a flow pattern along at least a substantial portion of their surfaces that are exposed to said contaminated air flow in order to substantially prevent the accumulation of said particulate matter thereon.

7. The improvement according to claim 5, further comprising at least one plenum chamber in said conduit means for receiving the air flow from said baffle means, and exhaust means for receiving said air flow from said plenum chamber and exhausting said air flow from said apparatus, said plenum chamber being sized to substantially reduce the velocity of said air flow therein from the velocity of said air flow through said baffle means in order to allow entrained moisture to drop out of said air flow.

8. The improvement according to claim 7, wherein said plenum chamber includes at least one moisture-eliminating baffle protruding into said air flow in order to collect at least a portion of said entrained moisture thereon.

9. In a paint spray booth having side walls, a perforate floor and means for supplying air to the interior of said booth and for exhausting said air through said perforate floor, the improvement comprising an apparatus for removing paint particles from said air, said apparatus including:

a sub-floor beneath said perforate floor, said sub-floor having an opening therein or receiving paint-laden air flowing therethrough, means for flowingly flooding the upper surface of said sub-floor with a fluid to a depth sufficient to substantially prevent accumulation of paint particles on said sub-floor, said sub-floor fluid also flowing into and through said flow opening;

means for producing a fluid spray, said fluid spray means being located below the elevation of said sub-floor and substantially out of said air flow;

means for inspirating at least a portion of said sub-floor fluid and for merging said flowing sub-floor fluid with said fluid spray to form a combined fluid spray as said sub-floor fluid flows into said flow opening;

conduit means located below the elevation of said sub-floor and communicating with said opening in said sub-floor for passing said paint-laden air through said combined fluid spray in order to remove said paint particles from said paint-laden air, said conduit means including a number of baffle members in said conduit means against which said fluid spray impacts, said baffle members being configured to direct said combined fluid spray along a generally serpentine fluid flow path and to direct said paint-laden air along a generally serpentine air flow path so that said paint-laden air passes through said combined fluid spray at least twice as it flows through said conduit means; and fluid collection means for collecting said combined fluid spray after said paint-laden air has passed therethrough and for draining said combined fluid spray from said conduit means.

10. The improvement according to claim 9, wherein said chamber includes at least one side wall having at least a portion thereof composed of a substantially transparent material.

11. The improvement according to claim 9, wherein at least one of said baffle members includes sound-absorbing material for reducing noise resulting from the impact of said combined fluid spray against said baffle member.

12. In a paint spray booth having side walls, a perforate floor and means for supplying air to the interior of said booth and for exhausting said air through said perforate floor, the improvement comprising an apparatus for removing paint particles from said air, said apparatus including:
 a sub-floor beneath said perforate floor, said sub-floor having an opening therein for receiving paint-laden air flowing therethrough, means for flowingly flooding the upper surface of said sub-floor with a fluid to a depth sufficient to substantially prevent accumulation of paint particles on said sub-floor;
 means for producing a fluid spray, said fluid spray means being located below the elevation of said sub-floor;
 means for merging said flowing sub-floor fluid with said fluid spray to form a combined fluid spray;
 conduit means located below the elevation of said sub-floor and communicating with said opening in said sub-floor for passing said paint-laden air through said combined fluid spray in order to remove said paint particles from said paint-laden air, said conduit means including
 a number of baffle members in said conduit means against which said fluid spray impacts, said baffle members being configured to direct said combined fluid spray along a generally serpentine fluid flow path and to direct said paint-laden air along a generally serpentine air flow path so that said paint-laden air passes through said combined fluid spray at least twice as it flows through said conduit means;
 said sub-floor including an apron member extending therefrom in a generally downward direction into said flow opening in order to flowingly direct said sub-floor fluid along said apron member and then into said flow opening, said fluid spray means being located beneath said sub-floor and beneath said apron portion in order to be out of the flow of said contaminated air, and said means for producing said fluid spray and said apron member being oriented generally in said downward direction in order to direct said combined spray flow into said flow opening to impinge upon said baffle means, and
 fluid collection means for collecting said combined fluid spray after said paint-laden air has passed therethrough and for draining said combined fluid spray from said conduit means.

13. The improvement according to claim 12, wherein said baffle members are configured to define said generally serpentine flow path therebetween, said baffle members further being configured to direct at least a portion of said combined spray in a flow pattern along at least a substantial portion of their surfaces that are exposed to said contaminated air flow in order to substantially prevent the accumulation of said particulate matter thereon.

14. The improvement according to claim 12, further comprising at least one plenum chamber in said conduit means for receiving the air flow from said baffle means, and exhaust means for receiving said air flow from said plenum chamber and exhausting said air flow from said apparatus, said plenum chamber being sized to substantially reduce the velocity of said air flow therein from the velocity of said air flow through said baffle means in order to allow entrained moisture to drop out of said air flow.

15. The improvement according to claim 14, wherein said plenum chamber includes at least one moisture-eliminating baffle protruding into said air flow in order to collect at least a portion of said entrained moisture thereon.

16. In an apparatus for removing particulate matter from contaminated air, said contaminated air flowing from a chamber through a perforate floor of said chamber, the improvement comprising:
 a sub-floor beneath at least a portion of said perforate floor, means for flooding said sub-floor with a flowing fluid to a depth sufficient to substantially prevent the accumulation of said particulate matter on said sub-floor as said contaminated air flows through said perforate floor, a flow opening in said sub-floor for receiving both said contaminated air and said sub-floor fluid flowing therethrough;
 means located out of said air flow for producing a fluid spray;
 means associated with said sub-floor for directing said sub-floor fluid into said fluid spray, at least a portion of said sub-floor fluid being inspirated by said fluid spray in order to form a combined fluid spray as said sub-floor fluid flows into said flow opening;
 conduit means communicating with said flow opening for passing said contaminated air through said fluid spray flow in order to remove said particulate matter from said contaminated air, said conduit means including
 baffle means in said conduit means for directing said fluid spray flow along a generally serpentine fluid flow path and for directing said contaminated air along a generally serpentine air flow path so that said contaminated air passes through said fluid spray at least twice as it flows through said conduit means; and
 fluid collection means for collecting said fluid spray flow after said contaminated air has passed therethrough and for draining said fluid spray flow from said conduit means.

17. The improvement according to claim 16, wherein said sub-floor, said fluid spray flow means, said conduit means and said fluid collection means are all located beneath the elevation of said perforate floor.

18. The improvement according to claim 17, comprising a pair of said sub-floors, a pair of said fluid spray flow means, a pair of said conduit means extending in opposite directions from said flow opening, and a pair of said fluid collection means, each of said conduit means being associated with one of said fluid spray flow means and one of said collection means.

19. The improvement according to claim 17, wherein said chamber includes at least one side wall having at least a portion thereof composed of a substantially transparent material.

20. The improvement according to claim 17, wherein said baffle means includes a number of baffle members against which said fluid spray flow impacts, at least one of said baffle members including sound-absorbing material for reducing the noise resulting from the impact of said fluid spray flow against said baffle member.

21. The improvement according to claim 17, wherein said means associated with said sub-floor includes an inclined apron portion extending from said sub-floor in a generaly downward direction into said flow opening, said inclined apron portion being oriented to direct said sub-floor fluid into said fluid spray to be inspirated thereby and generally toward said baffle means to impinge thereupon.

22. The improvement according to claim 17, wherein said baffle means includes a number of baffle members configured to define said generally serpentine flow path therebetween, said baffle members further being configured to direct at least a portion of said combined spray in a flow pattern along at least a substantial portion of their surfaces that are exposed to said contaminated air flow in order to substantially prevent the accumulation of said particulate matter thereon.

23. The improvement according to claim 17, further comprising at least one plenum chamber in said conduit means for receiving the air flow from said baffle means, and exhaust means for receiving said air flow from said plenum chamber and exhausting said air flow from said apparatus, said plenum chamber being sized to substantially reduce the velocity of said air flow therein from the velocity of said air flow through said baffle means in order to allow entrained moisture to drop out of said air flow.

24. The improvement according to claim 23, wherein said plenum chamber includes at least one moisture-eliminating baffle protruding into said air flow in order to collect at least a portion of said entrained moisture thereon.

* * * * *

UNITED STATES PATENT AND TRADEMARK OFFICE
CERTIFICATE OF CORRECTION

PATENT NO. : 4,515,073
DATED : May 7, 1985
INVENTOR(S) : Robert Dorsch and Arnold J. Matusz It is certified that error appears in the above-identified patent and that said Letters Patent is hereby corrected as shown below:

Column 1, line 30, "particles" should be --particulates--

Column 4, line 60, "confuit" should be --conduit--

Column 5, line 16, "102" should be --120--

Column 5, line 34, "optical" should be --optional--

Column 6, line 35, "perforated" should be --perforate--

Column 10, line 34, "or" should be --for--

Column 13, line 7, "generaly" should be --generally--

Signed and Sealed this

Third Day of December 1985

[SEAL]

Attest:

DONALD J. QUIGG

Attesting Officer        Commissioner of Patents and Trademarks

UNITED STATES PATENT AND TRADEMARK OFFICE
CERTIFICATE OF CORRECTION

PATENT NO. : 4,515,073

DATED : May 7, 1985

INVENTOR(S) : Dorsch et al

It is certified that error appears in the above-identified patent and that said Letters Patent is hereby corrected as shown below:

Column 8, lines 55-56, Claim 1, after "sub-floor" insert —fluid—

Signed and Sealed this

Eighth Day of December, 1987

*Attest:*

DONALD J. QUIGG

*Attesting Officer*              *Commissioner of Patents and Trademarks*